June 24, 1947. A. BRAMLEY 2,422,882
SEPARATION OF FLUIDS BY SIMULTANEOUS CENTRIFUGATION
AND SELECTIVE DIFFUSION
Filed Nov. 4, 1942 3 Sheets-Sheet 3

Patented June 24, 1947

2,422,882

UNITED STATES PATENT OFFICE 2,422,882

SEPARATION OF FLUIDS BY SIMULTANEOUS CENTRIFUGATION AND SELECTIVE DIFFUSION

Arthur Bramley, Long Branch, N. J.

Application November 4, 1942, Serial No. 464,509

15 Claims. (Cl. 233—1)

The present invention relates to processes and apparatus for separating fluid components of different molecular weights.

This application is a continuation in part of my copending application, Serial No. 417,960, filed November 5, 1941, for Centrifuge and method.

Refrigeration and dehydration aspects of the invention are included in my continuation in part applications, Serial No. 632,825, filed December 5, 1945, for Centrifugal dehydrating and cooling system, and Serial No. 706,739, filed October 30, 1946, for Dehydrating, liquefying or cooling gas and air.

A purpose of the invention is to increase the efficiency of separation of components of a fluid under a given centrifugal force and given rate of flow.

A further purpose is to cause fluid to flow bodily in a direction along the radius while it is undergoing centrifugation, so that the shifting of the molecules incident to flow will assist the sorting according to molecular weight produced by centrifugation.

A further purpose is successively to centrifuge a fluid consisting of a liquid, or a gas, or a vapor, or any mixture thereof in different chambers or cells of the same centrifuge causing the fluid to flow from one chamber or cell to the next, the same fluid under certain circumstances being liquid in the radially outer parts of the cells but a gas or a vapor or any mixture thereof where it passes through said inner wall of the centrifuge or is adjacent to it.

A further purpose is to improve the efficiency of fluid separation in a mixture of components by causing fluid to flow while being subjected to centrifugal force, in single or preferably multiple centrifuge cells.

A further purpose is to extract energy from the fluid and convert it into mechanical energy of rotation as it flows from the radially outer to the radially inner position by the turbine-like action of the fluid on baffles.

A further purpose is to utilize temperature fall in the fluid as the fluid expands adiabatically from a radially outer position to a radially inner position in the annular (outlet and/or connecting) passage.

A further purpose is to cause flow to a more advanced cell in a multiple cell centrifuge by withdrawing fluid from said more advanced cell through an inner orifice or preferably through a large number of inner orifices, as for example, an inner porous wall.

A further purpose is to locate porous walls of a multiple cell centrifuge at radially inner portions of the walls of the cells.

A further purpose is to pump off fluid through a radially inner porous wall of a centrifuge cell and to reintroduce the fluid pumped off into another cell of the centrifuge system.

A further purpose is to reintroduce fluid (liquid or vapor or gas or mixtures thereof) pumped off through porous walls of certain cells at the point in the series which will produce most efficient separation.

A further purpose is to increase the efficiency of separation of certain fluid mixtures by changing the state of one or all of the components through utilization of the temperature drop in the annular passage.

A further purpose is to locate baffles in intercell passages so as to facilitate removal of energy of fluid.

A further purpose is to locate the ports in the inter-cell passage so as to facilitate flow.

Further purposes appear in the specification and claims.

In the drawings, a few only of the various embodiments of the invention have been illustrated, those shown being chosen from the standpoint of convenience in illustration and satisfactory explanation of the principles involved.

Figure 2 is a section of Figure 1 on the line 2—2.

Figure 6 is a fragmentary central vertical section illustrating a further variation.

In the drawings like numerals indicate like parts.

The present invention is directed particularly to the separation of fluids of closely similar molecular weights. The invention may be applied to separating elements, isotopes of elements, compounds, compounds formed by isotopes, or any of these. While the invention is applicable to liquids, it is believed to have its best application to gases. It is possible by the present invention to separate gases having a difference in molecular weight of only 1, and gases having a difference of 3 or 4 in molecular weight can be very readily separated by the procedure of the invention.

Typical examples of gases which might be separated are methane and ammonia, light methane $C^{12}H_4$ and heavy methane $C^{13}H_4$, or nitrogen and oxygen. In scientific research the invention will be useful in separating isotopes, and in industrial work it will find application in commercial preparation of gases, for example, extracting oxygen from air.

Solutions such as ethyl alcohol and water may also be separated by use of the invention; also solutions of electrolytes. See page 257, vol. 10, Reviews of Modern Physics.

Figure 3:
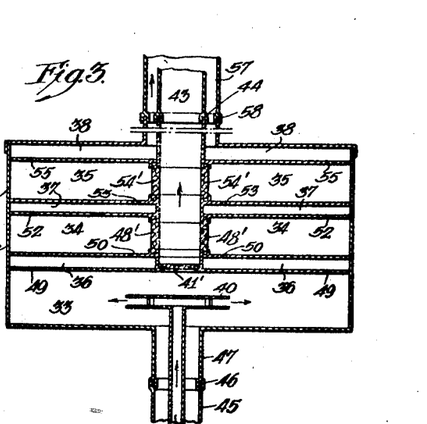
Figures 3, 3ª, 4, 5 and 7 are fragmentary diagrammatic vertical sections showing variations in the construction of the centrifuge.
Figures 3A, 9, 10, 11, 12:
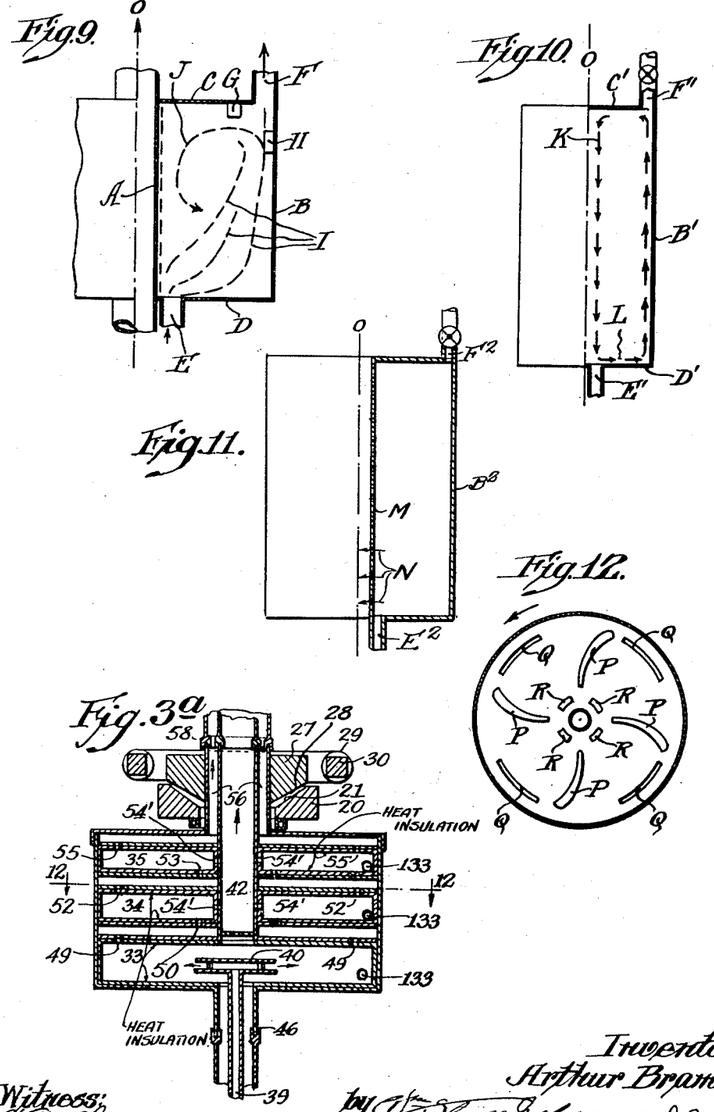
Figures 9, 10 and 11 are diagrammatic views used in explanation of the principles involved.
Figure 12 is a section on the line 12—12 of Figure 3ª and corresponding to Figure 2 but showing a modification.

In diagrammatic Figure 9 one section of a chamber in a plurality of successive series (sections) is shown, having inner and outer walls A and B and upper and lower walls C and D. The section is rotated around a vertical axis O. The wall A is an inner porous wall, by which I mean a wall characterized by capillary tubes extending through it between the interior of the chamber and the space radially between the chamber and the axis through which certain constituents or components are capable of passing, the lighter components passing through more freely than the heavier components.

Fluid is passed into the cell at E and out of the cell at F and heaters are applied at G and H.

The fluid is supplied cold or is cooled at or near the entrance E.

The path of the fluid through the cell under the pressure at the entrance E or suction at the outlet F is warped toward the right (radially outwardly) in the figure by centrifugating and the centrifugations moreover cause, separation of the heavier particles toward the right toward the periphery and the lighter particles toward the left in the figure. As a result the circulation generally is somewhat of the order of that shown by the dotted lines I. A fraction of heavier components finds outlet at F.

Circulation is aided and, if continuous inlet fluid be supplied and outlet be provided with a place to go, could be wholly controlled by the thermal circulating effect of the contrasting temperature at the inlet and the outlet.

In any event when the components are thrown radially outward (to the right in Figure 9) along lines I it is evident that the lighter components in the radially outer part are displaced and thus are given a radially inward movement (as generally outlined in fluid circulation line J). If now the pressure within the cell be more than that radially inside the wall A and the wall A be porous to the components (as by creating a partial vacuum to the left of wall A) the lighter components will be withdrawn preferentially from the cell to the left in the figure to any suitable discharge receptacle and for any suitable purpose.

It will be noted that the wall having capillary passages through it acts as a restrainer to the fluid generally but acts selectively to discharge certain components from the chamber; this accumulative action is continuous and progressive throughout the entire length of path of the cell, i. e. throughout the length of the cell from the inlet at E to the outlet at F, as distinguished from step by step discharge as it were, represented by discharge at F to the next unit let us say in a series or multi-unit form.

The discharge through the wall having capillary passages through it is selective to the extent that the lighter components will pass through the porous inner wall more freely than will heavier components having equal access to the porous wall; but is also selective to the extent that centrifugal force throws the heavier particles to the right, i. e. to the point of largest radii, and the components which have access to the wall having capillary passages through it are predominantly the lighter components.

The selection could be made in any way which diverts other than the lightest components from their radially outer position into controlling preponderance through the porous wall. Except as some special means of such diversion exists, components in engagement with the porous inner wall are assumed to be the lighter components. With the structure of Figure 9 there is, therefore, a concentration of heavier particles upon the outside adjacent wall B, and the consequent enrichment (if it may be so called) of the lighter components closer to the axis.

If the heaters be properly placed in Figure 9 it will be evident that the differences in temperature will assist in maintaining a swirl of the material inwardly at J. Simultaneously along this flow line there will be crowding out of lighter particles near the outside moving them inwardly toward the axis because of concentration of heavier particles toward the outer wall.

This action is more and more true as the length of the unit along the axis increases. This cyclic motion of the fluid facilitates the separation of the components of the fluid, gas, vapor or liquid.

When reference is made to a fluid diffusing through capillary passages, then the word "fluid" denotes gases, vapors, or mixtures of gases and vapors; however, if reference is made to a fluid in other parts of the cell, then the word "fluid" may denote liquids as well. For example, in a cell with the porous wall nearest the axis of rotation, the fluid may be a liquid along the outer wall and a vapor or gas along the inner wall. Moreover, in capillary passages there is always the possibility that a small amount of vapor will condense on the capillary walls.

When the porous wall is near the axis of rotation, there occur a number of processes, all of which are beneficial with respect to the flow of the lighter constituents towards the axis, "so that the final enrichment of the heavier and/or lighter component may be many times that obtainable in the simple centrifuge without porous walls or means for initiating and maintaining cyclic fluid motion." These processes are:

(1) The pressure gradient arising from viscosity, which assists the centrifugal pressure gradient in separating the particles out by diffusion.

(2) The high speed of rotation of the gas or vapor as it nears the axis of rotation, which causes a further differentiation between light and heavy molecules leaving the chamber. For very high speeds of rotation of the gas or vapor only the light molecules have high enough thermal velocities to enter the capillaries. Thus the concentration of light molecules diffusing through the porous wall is further enhanced.

Enrichment of the heavier component proceeds progressively as the outlet end of the unit is approached and will depend both on length of chamber, temperature difference and difference in centrifugal force in the cell.

These combined effects result in an accumulative action so that the final enrichment of the heavier and/or lighter component may be many times that obtainable in the simple centrifuge without porous walls or means for initiating and maintaining cyclic fluid motion.

In Figure 10 both sides of a cylindrical container are shown with an axis O parallel to their sides and passing through the center of the cell. Inlet is at E' and outlet at F'. Pressure is used at the inlet, or suction is used at the outlet—or both, to get a difference in pressure which causes circulation, and to secure fluid inlet at the one end near the axis and fluid discharge at the other end at maximum radius because of the difference in pressure, without using the heat differential between upper and lower plates for fluid separation, but securing enrichment of the heavier components along the radially outer part of the container and "enrichment" of the lighter components at the radially inner portion of the container by centrifugal action.

The entering fluid divides and follows along the outer wall B', to its upper plate C'. The fluid flow reverses in direction and moves back generally along the line K close to the axis.

As the fluid flows under the action of heat and centrifugal force in the manner described, the heavier component is preferentially concentrated in the outer flow stream and the lighter in the inner flow stream. This combined action results in a progressively increasing concentration of the heavier components toward the upper plate C and the lighter components toward the lower plate D.

If the heavier discharge component from one unit be introduced into another similar unit, centrifugal action in the second unit will continue to increase the weight of the component in the outer part of the second; and in each succeeding unit centrifugal action progressively increases the weight of the fluid which is centrifugally thrown radially outwardly.

Treatment of the lighter component fluid from one unit in a succeeding unit or in successive units gives a progressively lighter component in each successive unit. The form of Figure 10 operates when there is a heat differential as a means of securing circulation. Brewer and Bramley Patent No. 2,258,594 has used heaters not only to circulate the gas in motion but also as a basis for separating the gases. The beneficial action of the cyclic motion is fundamentally the same in both cases whether the primary separation results from a temperature differential or a pressure differential as in the centrifuge.

The fluid initially circulated may be cooled at L to provide or assist in securing the heat differential which causes circulation, or refrigerated gas may be introduced for the purpose.

The same thing which is true of the cooled inlet fluid and fluid heated adjacent the outlet in the figure may apply to successive units, the fluid being refrigerated as it enters each unit from the preceding unit and may be heated as it approaches the outlet from one unit into the next. This is shown conventionally, the intention being to use a heat differential as a means of securing circulation or assisting in circulation, and also permissibly as a means for securing separation in individual units or in successive units.

In Figure 10 the arrows show one side only but indicate circulation from an inlet E' outwardly toward the circumference to the outer part of the drum interior and along the outer part of the drum to an outlet F', a fraction of the heavier particles passing from the inlet to the outlet and the lighter particles being withdrawn close to the axis O. The form of Figure 10 needs auxiliary means such as heaters to set up cyclic circulation. The fluid is cooled at the lower inner part and heated at the upper outer part of the cell.

In Figure 11 a cell is shown diagrammatically in which a mixture of fluids is introduced at $E^2$ and withdrawn at $F^2$ and in the meantime suction acting through a porous wall M (which may be used in any of the forms, through which to withdraw preferentially the lighter fluid, the lighter gases or vapors) causes the fluids enriched in the lighter component to be diffused through the wall in the directions of the arrows N. The porous wall acts as a screen through which lighter fluid will flow with greater facility than will the heavier fluid. This again gives a discrimination or distribution by which the lighter fluids are separated out and withdrawn, resulting in what fluids are left being the heavier fluids; and as this takes place progressively along the length of the unit, the concentration of the heavier component is accumulative along the length. Circulation is secured by a pressure differential.

The greater facility of flow of the lighter fluids through the inner porous wall is true even when the mixture of gases is the same throughout the entire cross section except as it is affected by the vacuum exhaust of the lighter gases through the porous wall. It will be seen that the separation of lighter fluid components from the heavier will be even more marked if by centrifugal force, for example, the heavier fluid components are drawn away from the porous wall and the lighter form an undue proportion of the fluids which come in contact with the inner porous wall. In other words the suction through an inner porous wall gives additional means of discrimination or distribution by which the lighter fluids are separated out and withdrawn, resulting in further concentration within the outer part of the cell of the heavier fluids which are left. This again takes place progressively along the length of the cell.

Whenever the unobstructed centrifuge cells having radially inner porous walls provided with capillary openings are rotated, there is a whirling action of the gas or vapor, which moves at a speed controlled by the speed of the outer wall, and which flows across the inner porous wall at an absolute speed markedly greater than the speed of the inner porous wall, thus enhancing the separation of lighter from heavier constituents.

In Maier Patent No. 2,255,069 of September 9, 1941, a porous wall is used, but in a different way. In that invention the porous wall is used as a means of slowing down the draining of the lighter component, discriminating between the lighter gas which passes through easily (freely) and the heavier gas which does not pass through so freely; in the present invention the applicant increases relative concentration of the lighter gas along the porous wall by centrifugation.

Both of the examples of satisfactory materials for the filter given by me, plaster of Paris and diatomaceous earth, have passages of capillary character, and these are particularly well suited to accomplish my purpose. As elsewhere shown herein the porous wall may be used to provide passage of the lighter component in the separation or the heavier component thereof according to the relations of the pressure differential inside and outside of this wall.

The question of whether the porous wall acts to separate the light from the heavy, or perhaps the degree to which this takes place is one concerned with the dimensions and orientations of pores primarily. In addition to the use of the porous wall as a selective filter, in itself old, applicant uses it as a valve, that is, as a means of slowing down or regulating the withdrawal of the lighter particles already separated out from the heavier by centrifugal force.

Patents bearing upon the present invention have been issued to Maier, Resines 1,097,561, to Brewer and Bramley, both as above, and British No. 367,313. See also the Proceedings of the Royal Society, vol. 99, page 388, appearing in 1921.

Figures 2, 4, 5, 6:
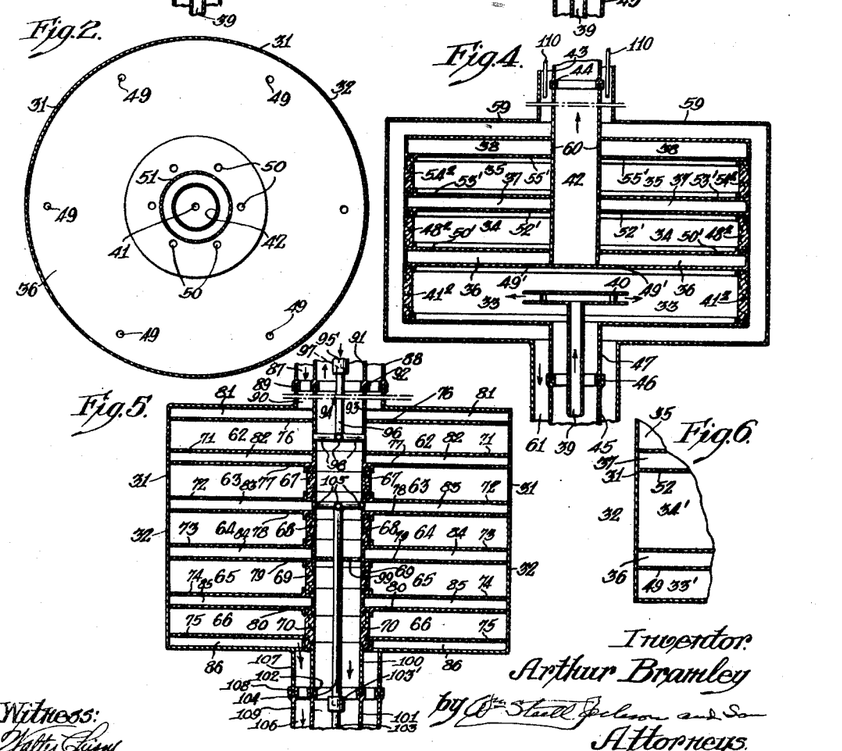

Figure 12 is a section taken at the same point as Figure 2 but shows a modification of the structure of Figure 2, as indicated in Figure 3ª. In Figure 12, I take advantage in each succeeding separating chamber or cell, of the reduction in temperature secured in the preceding connecting annular passages. This, as indicated, is secured by the adiabatic expansion during passage from radially outer to radially inner positions. The cooling effect of adiabatic expansion does not take place in Figure 4 because fluid is passing from the radially inner to the radially outer positions in these passages. Also in this Figure 4 form baffles within the passages will speed up the fluids rather than reduce their speed and will thus be supplying heat. It is necessary, therefore, in the connecting annular passages of Figure 4 to supply heat and mechanical energy to the fluid.

Figure 1:
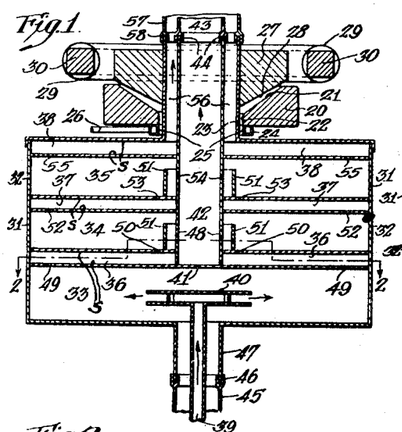
Figure 1 is a diagrammatic, central vertical section of a centrifuge embodying the invention.

In Figure 12 actual baffles are shown within the connecting spaces between two adjacent cells designated in Figure 1 as 36, 37 and 38, for example, and in Figure 4 as 36, 37, 38 and annular passage of 59 connecting to outlet 61. The baffles are indicated at P and can be used according to the direction of rotation either to receive pressure or to transmit pressure according to whether the inlet to this transition passage is from the outside at entrances Q with outlet ports R or from the inside openings R as inlets with outlet through the outside ports Q.

In other words the preferred direction of rotation is that of the arrow but the direction of rotation may be reversed when it is the intention to secure a different operation as in Figure 4.

In accordance with the invention, a mixture of fluid components is centrifuged repeatedly in successive chambers of a multiple cell centrifuge system.

In each chamber there will be a tendency to increase the content of one component in the fluid at the radially outer portion and increase the portion of another component at the radially inner portion. I will then preferably withdraw the mixture enriched in one component, for example, at the radially outer portion, and inject this enriched mixture into the next centrifuge cell at a point such that the mixture or part of it will normally diffuse and undergo bodily flow during centrifugation. Thus the fluid from the radially outer portion of the first cell will be desirably injected at the inner portion of the next cell forward in the direction of altimate exit, and caused to diffuse as well as to flow radially outward in the next cell during centrifugation.

I regard the continuous centrifugation in successive chambers or cells and the feeding into each successive cell of material progressively enriched in a particular component as important features of the invention.

In order to induce flow from one centrifuge cell to another, fluid is withdrawn from a more advanced centrifuge cell through an orifice or preferably through a porous wall (containing many orifices). The orifice or porous wall should preferably be located at the radially inner portion of the cell, although permissibly, it may be at some other portion, for example, the radially outer portion.

For the same purpose of facilitating beneficial flow from one centrifuge cell to the next such subsequent cell, or within any individual cell heating elements may be placed within the path of flow.

The centrifuge may be of any suitable type, but it should be adapted to attain a centrifugal force of a magnitude of several thousand times gravity. For some work, I prefer a centrifuge which attains a centrifugal force of a magnitude in excess of twenty thousand times gravity, but this is not in all cases necessary. The device may suitably be fluid (air) supported and air driven, steam driven or electrically driven in accordance with the proposals of Beams, et al. (See article by Skarstrom and Beams, Review of Scientific Instruments, vol. 11, page 398 (December 1940); and article by Beams and Snoddy, Science, vol. 85, page 185, 1937.)

The figures are largely diagrammatic.

In Figure 1, I illustrate a supporting ring 20 of Bakelite or other suitable material dished at 21 and having suitable clearance at 22 from the wall of the outer centrifuge supporting tube 23. The ring 20 is mounted on stationary structure not shown. An annular jet 24 mounted on the lower surface of the ring 20, and having orifices 25, introduces air in the space within and above the ring 20. Air is supplied to the annular jet 24 by a tube 26. Cooperating with the ring 20 is a tapered upper metallic ring 27 suitably fastened to the supporting tube 23 of the centrifuge. The lower conical surface 28 of the ring 27 cooperates with the upper surface 21 of the ring 20 and the air film between these two surfaces supports the centrifuge in operation.

The ring 27 is desirably the rotor of an induction motor whose field winding 29 and field core 30 are shown. The field winding and core 29 and 30 are mounted on suitable supporting structure not shown.

The mechanism just described is intended to be any conventional means of rotating and supporting the centrifuge. It is not part of the novelty of the present invention. In the other figures, this mechanism has been omitted, simply being indicated by broken lines near the top of each centrifuge.

The centrifuge body 31 consists of an outer shell 32, annular centrifuge chambers or cells 33, 34 and 35 and annular centrifuge passages 36, 37 and 38. The centrifuge itself will in its main parts be constructed of any suitable alloy, such as stainless steel.

Plastics of suitable tensile properties in certain parts or forms would also be suitable especially where heat insulation is important. A certain amount of heat insulation could be secured, particularly on the facing walls of annular connecting passages between successive compartments or cells providing for radial flow. Suitable plastics are molded methacrylate known by various trade names such as "Lucite."

Heat insulation is shown at S, Figure 1, and need not occupy much space. For example it can be spread on as a liquid coating, quick drying or slow drying. In lacquer form it may comprise, for example, acrylate or methacrylate, known by various trade names, such as "Crystallite," "Lucite" and "Plexiglas"; and furfural phenolic, known also as "Durite."

The mixture of fluids to be separated is introduced through a stationary pipe 39 having a distributing head 40, both of which may be heat insulated. Without departing from the invention of a centrifugal apparatus rotating about an axis of symmetry, the fluids can be introduced into said apparatus after previously cooling or heating and consequently the apparatus can be heat insulated or heated in whole or part; the operation can be effected in the presence of any fluid under partial vacuum or under pressure in any of its several parts.

Though the idea of recirculation is not new, the path chosen for the fluid being recirculated is new and this reduces the number of pumps required greatly. The number of pumps per cell can be reduced to less than one per cell by this arrangement of recirculation. The exact number will depend on the size of the group of cells in which the operation is repeated and on the nature of the operation; that is, whether the light fraction only is recirculated.

After leaving the distributing head 40, the fluid is subjected to the centrifugal action of the cell 33 and the fluid near the outer circumference is enriched in the heavier component. Correspondingly the lighter component will tend to concentrate near the inner portion. The fluid component near the inside of the cell 33 will be drawn out through the orifice 41 into a rotating axial passage 42 and a stationary tube 43 sealing at 44 with the axial passage. This lighter fluid will be withdrawn under the action of a suitable pump, not shown, and may be stored or recirculated in the apparatus, for example, by injecting it or some part of it into the stationary tube 45 which seals at 46 with the moving tube 47, also entering the chamber 33.

Reference will be made from time to time to seals such as those indicated, diagrammatically, at 44 and 46. Depending upon the degree of sealing efficiency required, these may be walls having close clearance, or fluid seals such as oil seals, as well known in this art.

From the cell 34, fluid is likewise withdrawn into the tube 42 through orifices 48, and this displacement of fluid from the cell 34 tends to produce bodily flow parallel to the radius of cell 33 and to cause fluid in cell 33 to flow into cell 34. Such flow from cell to cell, is possible through the ports 49 located near the outer edge of cell 33, through the annular passage 36, and through the ports 50 located near the inner edge of cell 34.

It will be noted that the portion of the fluid in cell 33 which is enriched in heavier components will be injected or introduced in the inner portion of the cell 34 through the ports 50. Further action of the device will cause part of the fluid to flow outwardly through cell 34 and at the same time subject such fluid to the action of the centrifuge. It is not desirable to have the fluid which enters the ports 50 largely withdrawn through the orifices 48 and this can be prevented by baffles 51.

The structure interconnecting cell 34 with cell 35 consists of ports 52 communicating with annular passage 37 and ports 53 from this passage into cell 35. Here again, fluid enriched in the heavier component in cell 34 is introduced near the inner edge of cell 35 for further enrichment in the heavier component under the action of that cell.

The inner orifices 54 in cell 35 will, as in the previous cases, withdraw a fluid mixture enriched in the lighter component through the inner passage 42, and thence to the pump.

There can be any desired number of cells and each succeeding cell or group of cells may be a duplicate of a preceding cell or a group of cells, just as cell 35 is a duplicate of cell 34. The final product is withdrawn through ports 55 near the radially outer edge of chamber 35 and then carried by annular passage 38 to the tubular outlet passage 56 between the walls of tubes 23 and 42. The effluent is thence withdrawn through the space between stationary tube 43 and stationary tube 57, which connects to tube 23 by seal 58.

The orifices 41, 48 and 54, by their size and number, determine what proportion of the fluid will be withdrawn to the pump, and in individual cases it may be desirable to enlarge or plug orifices until the orifice area is adjusted to the proper value for the material undergoing treatment.

The device of Figure 3 is substantially identical with that of Figures 1 and 2, except that porous walls such as diatomaceous earth, or plaster of Paris or other suitable porous walls have been substituted at 41', 48' and 54' to replace orifices 41, 48 and 54. This arrangement is much more efficient than that of Figures 1 and 2 as the adjustment of the orifices to the desired very minute size is a matter of considerable difficulty. It is by no means desired to have all of the fluid pass through the porous walls or orifices, and sufficient resistance to flow is difficult to obtain with orifices of the usual type. Also in the form of Figure 3, the baffles 51 have been omitted to indicate that they are not always necessary.

In some cases it will be desirable to operate the centrifuge so that the material conducted from cell to cell without passing through the orifices or porous walls will be the material enriched in the lighter component, rather than that enriched in the heavier component as in the forms of Figures 1, 2 and 3. It may also be preferable in certain cases to locate the porous walls or orifices at the radially outer rather than the radially inner portion of the centrifuge. These differences are indicated in Figure 4.

When the heavier pressure is on the inside in Figure 3, the entire flow of fluid will pass outwardly through the porous wall. The fact that the heavier particles have the greater centrifugal force acting upon them than upon the lighter particles assists in passing these heavier particles through the inner porous wall.

Except as relieved by passing the heavier particles from the radially outer part of the cell to another cell or withdrawing them altogether and similarly withdrawing the lighter particles from the inner part of the cell, there will be an increasing accumulation of pressure of heavier particles in the radially outer part of the cell which correspondingly separates these heavier particles out from the mixture and crowds the lighter particles to the radially inner part of the cell.

On the other hand, if the greater pressure be from the outside, i. e. from the interior of the cell, upon the outer surface of the porous wall in Figures 3 and 5, the passage of particles will be largely the passage of the lighter component forced through the wall by accumulating pressure due to concentration of the heavier particles in the radially outer part of the cell. The accumulation of lighter particles will occur at the inner part of the cell and they will be forced inwardly through the porous wall into the interior within the wall.

In Figure 3ª I illustrate a centrifuge similar to that of Figure 3, with the turbine blades applied in the passages between the cells as shown by Figure 12, which is a section on the line 12—12 of Figure 3ª. Heaters are indicated at 133, and separate layers of heat insulation are shown on the walls of the cells.

In Figure 4, the porous walls are located at the radially outer portion at 41², 48² and 54² rather than at the radially inner portion as in Figure 3. The entire device is surrounded with a jacket 59 so that partial vacuum can be maintained in the space surrounding the centrifuge.

In Figure 4, inlet under suitable pressure is provided at 39 and 40 as before. The diversion or withdrawal of fluid now consists of material enriched in the heavier component, and therefore in the device of Figure 4 the fluid containing the lighter component is preserved and drawn into the next cell through ports 49', passage 36 and ports 50'. In cell 34 the inlet fluid arrives at the radially outer portion adjacent the porous wall through which the heavier component can be partially removed, the lighter component being further enriched by the time the fluid reaches the inner portion of the cell 34. Fluid enriched in the lighter component will then be carried through the ports 52', passage 37 and ports 53' into cell 35. The final product will be carried through ports 55' into passage 38 and thence through ports 60 into tubes 42 and 43 for withdrawal to a place of storage.

The fluid passing through the porous walls suitably will be withdrawn as at 61 to a pump from an annular passage which may be provided with baffles like turbine blades in order to extract energy from the fluid as it flows from a radially outer to a radially inner position and utilize it as energy of rotation, and then returned to the device if desired through the tubes 45 and 47.

In employing large groups of centrifuge cells it frequently will be desirable to recirculate the fluid passing through one or more porous walls in the latter part of the series, reintroducing this fluid at an earlier part of the series.

In Figure 5 the axial direction of flow is reversed with respect to the earlier figures. The cells 62 to 66 have porous walls 67 to 70. Ports 71 to 75 are located at the radially outer edges, and ports 76 to 80 are located at the radially inner edges. Connecting annular passages are provided at 81 to 86. Initial inlet is accomplished under suitable pumping pressure in the space 87 between the stationary outer pipe 88 sealing at 89 with the rotating outer pipe 90, and intermediate stationary pipe 91 sealing at 92 with rotating intermediate pipe 93.

From the cells 63 and 64 fluid passing through the porous walls is withdrawn through the central chamber 94 to the pump (not shown) and then wholly or partially reintroduced through central stationary pipe 95 and central rotating pipe 96 to which it seals at 97.

The pipe 96 distributes in radial branches at 98 to the inner portion of cell 62. The fluid passing through porous walls 69 and 70 cannot flow directly toward the inlet end of the device because of partition 99 in rotating pipe 93. It will be withdrawn axially through the annular space within the rotating tube 100 and stationary tube 101 to which it is sealed at 102, and, after passing through the pump, will be reintroduced in whole or in part through the stationary pipe 103, seal 103', rotating central pipe 104 and spreader 105 into the annular passage 83, between cells 63 and 64.

A certain amount of fluid passing through porous walls 69 and 70, and which is recirculated into passage 83, will be carried directly into cell 64, while a somewhat smaller amount may be returned into cell 63, depending upon the relations of the pressures and centrifugal forces. The heavier product will be withdrawn from the device through annular space 106, within rotating pipe 107, sealed at 108 to stationary pipe 109.

The above device is effective as a regenerative device in which the fluid passing through the porous walls to any desired proportion can be recirculated. The fluid passing through the porous walls later in the series need not be mixed with that passing through the porous walls earlier in the series and having a substantially different composition.

Figure 5 has the advantage that there is distinction between the various stages of enrichment of a particular component of the fluid withdrawn through the porous walls. The materials highly enriched in a given component are not wastefully mixed with those only slightly enriched in that component.

The cells or chambers need not and preferably will not be of the same size in all cases. Thus in Figure 6 the chamber 33' is comparatively small and the chamber 34' is comparatively large with corresponding change in dimensions of the porous walls.

The character of pumping which is employed is not critical in the present invention. It is generally most convenient to use external mechanical pumps to maintain a pressure differential on opposite sides of the orifices or porous walls, but if desired, the same may be accomplished by aspirator or injector principles.

In Figure 4, I illustrate at 110 steam jets which introduce steam into the jacket space and cause the steam to sweep around the centrifuge rotor in contact with the porous walls, thus creating the effect of suction and tending to withdraw fluid through the porous walls by injector action. Where this form is used instead of the normal pump, the steam should be condensed and the moisture eliminated before recirculating the fluid.

In some instances, particularly when separating fluids of high viscosity, it may be desirable to employ heat to cause the fluid to flow more freely or to flow more appropriately to assist centrifugation. Furthermore, change in density of the fluid due to heating in the centrifuge aids in effecting partial separation of the components. It may also be desirable in some cases to make the regenerating system self-contained, rather than to locate it outside the centrifuge.

Figure 7:
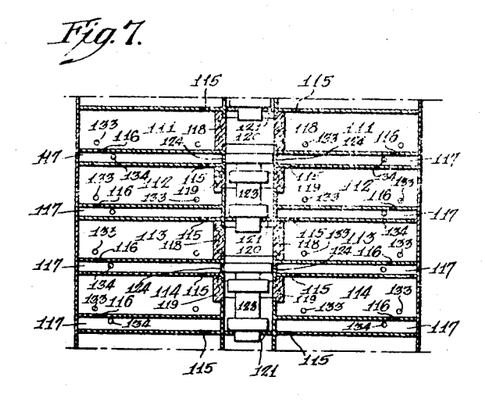

Figure 7 shows a centrifuge having several cells, each of which is provided with heating means and also with self-contained recirculators. Flow from cell to cell is downward in the cells as shown on the drawing. The cells 111 to 114 are not necessarily the endmost cells of the centrifuge, as indicated by the fact that the wall is broken at the top and bottom. In each cell, in Figure 7 there are inlet ports 115 located at radially inner positions and outlet ports 116 located at radially outer positions. The inlet and outlet ports 115 and 116 communicate through annular passages 117. Each alternate cell has a relatively large area porous wall 118 while the next cell, which forms a part of the same pair, has a much smaller area porous wall 119.

Fluid passing through the porous walls 118 and 119 of any pair of cells enters an inner chamber 120. The inner chambers 120 are bounded at each end by partitions 121. Fluid from each inner chamber 120 is drawn into an inlet port 122 of a pumping unit 123 and discharged at 124 into the annular passage 117 at the middle of the next pair of cells preceding those from which the fluid was removed. Thus the immediately preceding cell is by-passed by the fluid which has passed through the porous walls of any pair of cells.

Those cells are viewed here as the earlier or later in the series, according to the time when they are reached by the unprocessed material introduced; that is, the first cell is that to which the material is first introduced and the last cell is that cell at the other end of the array from which the material concentrated in one of the constituents is discharged.

Figure 8:
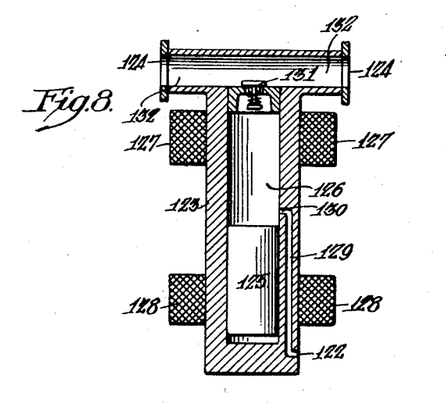
Figure 8 is an enlarged fragmentary section parallel to the paper of the structure seen in Figure 7.

The pumping unit as shown in Figure 8 desirably consists of a reciprocating plunger 125 in a cylinder 126 moved back and forth by electrical solenoids 127 and 128 and actuated by any suitable means through an electric circuit suitably introduced to the certrifuge by slip rings or otherwise. Intake to the pumping means for the inlet port 122 is through a passage 129 and port 130 which are always open. Discharge is through a check valve 131 and radial ports 132. The mechanism at 122 is intended to be any suitable conventional pumping device.

The detail of the heating circuit and the solenoid-operated pump and its electrical connections is not novel per se and the detail does not affect the present invention. They have therefore been treated and illustrated conventionally.

In the cells I provide heating means, preferably electrical resistance heating unit 133. These heating means may be supplied with power through an electric circuit connected to the rotor through slip rings.

The electric heating units serve to maintain better distribution of fluid flow in the cells.

It will be evident that in the present invention, the fluid components are caused to flow by pressure differential produced by pumping and by heating while the fluid is undergoing centrifugation and is progressively enriched in a given component in one cell after another of a train of centrifuge cells or chambers.

It will further be evident that fluid displacement and flow are induced by conducting fluid through an orifice or porous wall in a particular centrifuge cell.

It will further be evident that the separation of components of the fluid is enhanced by utilizing the temperature drop in and extracting energy from the fluid in the annular (connecting and/or outlet) passages.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my invention.

Having thus described my invention what I claim as new and desire to secure by Letters Patent is:

1. A solid-wall type centrifuge having a rotor containing a plurality of cells, walls forming connecting passages between the cells inner, porous walls in the various cells, each porous wall being characterized by capillary passages in the direction of flow and constituting the inner boundary wall of its cell chambers radially within said porous walls, means for delivering a mixture of fluids of different molecular weights to the first cell, means for conveying fluid passing through the porous wall of the last cell and into the chamber to a connecting passage between two earlier cells, means for conveying fluid passing through the porous walls of these earlier cells and into the chambers of such cells to a connecting passage between two still earlier cells, means for removing the fluid at one extreme of molecular weight from the last cell and means for removing the fluid at the other extreme of molecular weight from the first cell.

2. A solid-wall-type centrifuge having a rotor containing a plurality of cells, walls forming connecting passages between the cells, inner porous walls in the various cells, each porous wall being characterized by capillary passages in the direction of flow and constituting the inner boundary wall of its cell, chambers radially within the porous walls, means for heating the content in the various cells, means for heat insulating the walls of the cells and connecting passages, means for delivering a mixture of fluids of different molecular weights to the first cell, means for conveying fluid passing through the porous wall of the last cell and into the chamber to a connecting passage between two earlier cells, means for conveying fluid passing through the porous walls of these earlier cells and into the chambers of such cells to a connecting passage between two still earlier cells, means for removing the fluid at one extreme of molecular weight from the last cell and means for removing the fluid at the other extreme of molecular weight from the first cell.

3. A solid-wall-type centrifuge having a rotor and a plurality of cells in series, adapted to centrifuge gases, vapors or a mixture of gases and vapors, solid walls perpendicular to the axis of rotation of the cells constituting the end boundaries of the cells and constituting the plane boundaries of the passages between the cells in series, with radially outer outlet means in one cell and radially inner inlet means in the next succeeding cell connecting the individual cells of the series through said passages, porous walls having capillary passages constituting the inner boundaries of the various cells, means within the rotor for forcing the gases, vapors, or the mixture of gases and vapor through the porous walls, radially disposed turbine-like blades within the passages for engaging and directing the flow of gases, vapors, or of the mixture of gases and vapors through the passages from the periphery to the center, and means for heat insulating the walls of the cells and of the connecting passages.

4. In a solid-wall-type centrifuge, a plurality of centrifugal cells individually unobstructed on the interior and arranged in series, axially in line, there being porous walls located at radially inner portions of the various cells, the porous walls being characterized by capillary passages through them, radially inner inlet means in the end wall of the first cell for introducing gases, vapors, or a mixture of gases and vapors and radially outer outlet means in the end wall of the last cell for discharging the gases, vapors or the mixture of gases and vapors, passages connecting the radially outer portion of each cell with the next cell at a radially inner portion, and means for directing the gases, vapors, or the mixture of gases and vapors from the radially outer outlet means in one cell into the radially inner inlet means of the next succeeding cell, and means for rotating the centrifuge at a speed which produces a centrifugal force of at least several thousand times gravity.

5. In a solid-wall-type centrifuge, a plurality of centrifuge cells axially in line, there being porous walls having capillary passages located at radially inner positions of all of the cells constituting the inner boundary of each cell, radially inner inlet means in the solid end wall of the first cell for introducing gases, vapors, or a mixture of gases and vapors into the first cell, radially inner inlet means in a cell and radially outer outlet means in the same cell for introducing the heavier components from each cell except the last one into a succeeding cell, means for forcing the gases, vapors, or the mixture of gases and vapors through the porous wall of a group of adjacent cells and for introducing the gases, vapors, or the mixture of gases and vapors back into the inlet means of an earlier cell, and means for forcing the gases, vapors, or the mixture of gases and vapors through the porous wall of the last cell and for discharging them out of the system.

6. In a solid-wall-type centrifuge, a plurality of centrifuge cells axially in line, there being porous walls having capillary passages located at radially inner portions of all of the cells except the first, constituting the inner boundaries of these cells, radially inner inlet means in the solid end wall of the first cell for introducing gases, vapors or a mixture of gases and vapors into the first cell with radially outer outlet means in each of a number of cells and radially inner inlet means in the next succeeding cells, each communicating with the adjacent outlet means for introducing the heavier components from the respective cells except the last one into the next succeeding cell, the cells being arranged into a first group of adjacent cells and succeeding groups, means for forcing the gases, vapors or a mixture of gases and vapors through the inner porous walls of any group of adjacent cells except the first group and for introducing the gases, vapors or a mixture of gases and vapors back into the passage connecting two preceding cells adjacent those from which they came, and means for discharging the gases, vapors or the mixture of gases and vapors from a radially outer outlet of the last cell.

7. In a solid-wall-type centrifuge, a plurality of coaxial and axially displaced centrifuge cells, walls perpendicular to the axis of rotation, constituting the end boundaries of their respective cells, forming passages between the cells in series with radially outer outlet means in one cell and radially inner inlet means in the next succeeding cell, for introducing the heavier component from each cell except the last one into the next succeeding cell, there being an inner porous wall constituting the inner boundary wall of each cell characterized by capillary passages in the wall, means for introducing the gases, vapors or a mixture of gases and vapors to be separated into the first cell at radially inner inlet points in the solid end wall, means for forcing the gases, vapors or a mixture of gases and vapors through the porous walls of the first and second cells into the radially inner inlet means of the first cell, means for forcing the gases, vapors or a mixture of gases and vapors through the porous walls of pairs of adjacent centrifuge cells except the first pair, back into the stream of gases, vapors or a mixture of gases and vapors in the passage connecting the preceding pair of centrifuge cells from which it came, means for discharging out of the system the heavier component in the last cell, means for diverting part of the gases, vapors or a mixture of gases and vapors forced through the porous walls of the last cell of the last pair of cells, back into the stream of gases, vapors or mixtures of gases and vapors, through inlet means in the passage connecting the preceding pair of centrifuge cells.

8. The process of separating heavier constituents from lighter constituents in the form of gases, vapors, or a mixture of gases and vapors within a rotatable chamber in a solid-wall-type centrifuge having an inner porous division wall with capillary passages constituting the inner boundary of said cell, which consists in whirling under a centrifugal force of at least several thousand times gravity, gases, vapors, or a mixture of gases and vapors about a vertical axis within an unobstructed rotary space bounded upon the inside toward the axis by a porous wall made porous by the presence of capillary passages and adapted to pass the lighter constituents of the gases, vapors or a mixture of gases and vapors more freely than the heavier constituents of the same gases, vapors, or mixtures of gases and vapors, in crowding the heavier consttuents radially outwardly by centrifugal force and concurrently crowding the lighter constituents toward the porous wall by the crowding of the heavier constituents outwardly, and in withdrawing the lighter constituents through the porous wall and the heavier constituents from one end of the chamber at the outer part of the space by the pressure of new inlet gases, vapors, or mixtures of gases and vapors introduced at the other end.

9. The process of separating heavier constituents from lighter constituents in the form of gases, vapors, or a mixture of gases and vapors within a rotatable chamber of a solid-wall-type centrifuge having a rotary unobstructed space and having an inner porous division wall with capillary passages, which consists in introducing the gases, vapors, or a mixture of gases and vapors at one end of the chamber near the axis while withdrawing the heavier constituents from the other end of the chamber at a radially outer upper part of the chamber, in whirling under a centrifugal force of at least several thousand times gravity, the gases, vapors or a mixture of gases and vapors in the rotary unobstructed chamber space extending from the radial inner to the radial outer limit of the chamber and in concurrently withdrawing in the form of gases, vapors, or mixtures of gases and vapors by suction through the porous wall characterized by the presence of capillary passages the lighter constituents displaced from the radially outer part of the space by the heavier constituents and thereby crowded toward the porous wall by pressure differential, thus relatively increasing their flow through the said inner porous wall.

10. In a solid-wall-type centrifuge, a plurality of centrifuge cells axially in line, there being porous walls located at radially inner boundaries of certain of the various cells, the porous walls being characterized by capillary passages through them, passages connecting a radially outer portion of a cell with the next cell at a radially inner portion, and means for forcing gases, vapors, or mixtures of gases or vapors through the porous walls of a cell and reintroducing the gases, vapors or mixtures of gases or vapors into a cell earlier in the line.

11. In a solid-wall-type centrifuge having a rotor containing a plurality of cells in series and having passages between the cells extending from a radially outer position of an individual cell to a radially inner position of a succeeding cell of the series, radially disposed baffles of turbine blade type in the various passages for cooling the gas or vapor by the gas or vapor flowing through the passages from the periphery to the center directed by the radially disposed baffles, means for heat insulation of the passage walls, and means for introducing gas or vapor to the centrifuge and for withdrawing it therefrom.

12. A pair of centrifuges axially in line and having common driving means, and means for heat insulating the centrifuges from each other, in combination with solid walls perpendicular to the axis of rotation, constituting the end boundaries of the cells forming a passage between the outer part of the first and the inner part of the second, for passage of gas between, and radially disposed turbine blades within the passage directing from a radially outer position of the first cell to a radially inner position in the second cell the gas travelling through the passage, thus utilizing the work done by the expansion of the gas and by the centrifugal forces acting on the gas.

13. The method of separating vapors or gases, which comprises continuously subjecting them to centrifugal action in a solid-wall-type centrifuge to effect a substantial separation of the vapors or gases in accordance with their molecular weight, whirling under a centrifugal force of at least several thousand times gravity, the mass of vapor or gas in the centrifuge at a rate determined by the linear speed of the radially outer portion of the centrifuge, unobstructed in the centrifuge, and simultaneously withdrawing the lighter fraction of the vapors or gases from the central portion of the centrifuge through an inner porous wall having capillary passages and constituting the inner boundary wall of the centrifuge, the gas or vapor moving across the inner porous wall having a markedly greater speed than the inner porous wall to impart selectivity to the separation, and concurrently withdrawing the heavier fraction from an opening in the wall on or near the outer periphery of the rotor.

14. The method of separating vapors or gases, which comprises continuously subjecting them to centrifugal action under a centrifugal force of at least several thousand times gravity in a solid-wall-type centrifuge, thus effecting a substantial separation of the vapors or gases in accordance with their molecular weights, in a plurality of stages, and simultaneously passing the vapors or gases along the radially inner boundary wall of the centrifuge in unobstructed flow at a linear speed markedly greater than the linear speed of the inner boundary wall, withdrawing the lighter fraction of the vapors or gases out through the central portion of the centrifuge through porous walls made porous by capillary passages and constituting the inner boundary wall of the centrifuge, withdrawing the heavier fraction through openings near the outer periphery of the first stage, subsequently directing the gases and vapors substantially through radially disposed converging passages in the travel between the first and second stage into the second stage and during said passage transforming a portion of the kinetic energy of the gas or vapor into mechanical work by engaging the walls of radially disposed converging passages, thereby cooling said gas or vapor.

15. A solid-wall-type centrifuge having an unobstructed rotatable chamber provided with an inner porous division wall with capillary passages constituting the inner boundary of said chamber, means for introducing gases, vapors, or a mixture of gases and vapors within the unobstructed chamber, means for rotating the centrifuge and whirling under a centrifugal force of at least several thousand times gravity, the gases, vapors or a mixture of gases and vapors about the chamber and across the porous division wall at a speed markedly greater than the speed of travel of the porous division wall to aid in selectivity of separation, means for drawing off lighter components through the porous division wall and means for drawing off heavier components at a radially outer portion of the chamber.

ARTHUR BRAMLEY.

REFERENCES CITED

The following references are of record in the file of this patent:

UNITED STATES PATENTS

| Number | Name | Date |
|---|---|---|
| 1,061,656 | Black | May 13, 1913 |
| 736,976 | Keiper | Aug. 25, 1903 |
| 1,736,792 | Lundgren | Nov. 26, 1929 |
| 1,530,758 | Coleman | Mar. 24, 1924 |
| Re. 21,168 | Coutour | Aug. 1, 1939 |
| 1,482,229 | Hapgood | Jan. 29, 1924 |
| 1,534,604 | Termeer | Apr. 21, 1925 |
| 1,097,561 | Resines | May 19, 1914 |
| 669,732 | Ohlsson | Mar. 12, 1901 |
| 2,067,273 | Knowles et al. | Jan. 12, 1937 |
| 1,882,390 | MacKsaac | Oct. 11, 1932 |
| 2,255,069 | Maier | Sept. 9, 1941 |
| 2,258,594 | Brewer et al. | Oct. 14, 1941 |
| 2,105,217 | Kelling | Jan. 11, 1938 |

FOREIGN PATENTS

| Number | Country | Date |
|---|---|---|
| 398,767 | Germany | July 15, 1924 |

OTHER REFERENCES

Beams et al., "Concentration of Isotopes," The Physical Review, volume 56, No. 3, Aug. 1, 1939, page 270. (Copy in Scientific Lib.)

Beams, "High Speed Centrifuging," Reviews of Modern Physics, volume 10, No. 4, Oct. 1938, pages 257, 260, 261, 262. (Copy in Scientific Library.)

Roebuck, Journal of Applied Physics, volume 16, pages 285 and 286. (Copy in Scientific Library.)